United States Patent [19]

Kirtley

[11] Patent Number: 4,715,769

[45] Date of Patent: Dec. 29, 1987

[54] RAIL SUPPORTED ARTICULATED CLIMBING DOLLY

[76] Inventor: Robert E. Kirtley, 30 N.E. 65, Oklahoma City, Okla. 73105

[21] Appl. No.: 853,110

[22] Filed: Apr. 17, 1986

[51] Int. Cl.⁴ .............................................. B65G 11/02
[52] U.S. Cl. ..................................... 414/571; 414/538
[58] Field of Search ............... 414/538, 571; 104/108, 104/243; 280/82, 100

[56] References Cited

U.S. PATENT DOCUMENTS

| | | | |
|---|---|---|---|
| 2,191,184 | 2/1940 | Voorheis | 280/100 |
| 2,387,082 | 10/1945 | Malling | 414/538 X |
| 2,659,504 | 11/1953 | Kranawetvogel et al. | 414/538 X |
| 2,958,432 | 11/1960 | Milhem | 414/538 X |
| 3,480,166 | 11/1969 | Abbott | 414/538 X |
| 3,524,412 | 8/1970 | Wilson | 414/498 X |
| 3,809,266 | 5/1974 | Salerni | 414/538 X |

*Primary Examiner*—Leslie J. Paperner
*Assistant Examiner*—Stuart J. Millman
*Attorney, Agent, or Firm*—Robert K. Rhea

[57] ABSTRACT

In a climbing four-wheel dolly for moving a load from one elevation to another, a pair of box-channel tracks form a ramp in which sliding door track rollers, mounted on the axle support adjacent the respective dolly wheel channel track, guidingly support the dolly. The dolly is moved up or down the tracks by a winch and pulley arrangement having a cable connected with a tongue at one end of the dolly.

2 Claims, 8 Drawing Figures

RAIL SUPPORTED ARTICULATED CLIMBING DOLLY

BACKGROUND OF THE INVENTION

1. Field of the invention.

The present invention relates to dollys and more particularly to a winch operated dolly and track ramp for moving or unloading articles of relatively large mass from one elevation to another.

Individuals moving furniture, drums of oil or other articles of considerable mass from one location to another in which a pickup truck is the usual mode of transportation presents a problem for the home owner or pickup truck driver when loading and unloading the articles being moved. Bulky articles and those of considerable mass require two or more workmen for loading and unloading the articles into and out of a truck. The extra manpower is not always available and is not needed between the point of loading and unloading. Further, manually lifting and loading heavy weight articles to and from a pickup bed increases the chances of injury to one or more of the workmen.

This invention provides an apparatus by which one workman may safely and easily move units of considerable mass and bulk from one elevation to another, such as loading into and out of a pickup bed or up or down a flight of stairs.

2. Description of the prior art.

Prior patents such as U.S. Pat. Nos. 2,387,082 and 2,958,432 generally disclose rails or tracks mounted on or connected with vehicle elevated areas, such as for camper cabs on pickup trucks or lifting and lowering a fishing boat from the surface of the earth to and from a vehicle loaded position and vice versa in which a winch and pulleys are employed for moving the boat, camper or other article. Such patents also generally disclose a one purpose use of moving an article from one elevation to another which for the most part do not disclose an apparatus capable of moving a selected or succession of the same or different articles from one elevation to another.

SUMMARY OF THE INVENTION

Dolly forming wheel and axle supporting frames underlie respective end portions of a four-wheel dolly platform. The dolly wheel frames are centrally connected to the platform by a spacing rod for horizontal pivoting movement. A radius rod extends angularly between the frames and diagonally of the dolly platform for articulated movement of the dolly wheel frames when on a horizontal surface. Each dolly wheel is provided with pairs of track rollers for dolly supporting movement through a pair of parallel box-channel tracks extending from one elevation to another. A track supported winch and pulley system, connected with a tongue on the dolly, moves the dolly and any load on its platform up or down the tracks.

The principal objects of this invention are to provide a knockdown track climbing dolly easily operated by one workman which includes a dolly wheel/track aligning guide for moving articles from one elevation to another, without separation of the dolly from the tracks, or across a horizontal surface, requires a minimum of cargo space during storage or operation and provides maximum maneuverability in close quarters.

DESCRIPTION OF THE PREFERRED EMBODIMENTS

Figure 1:
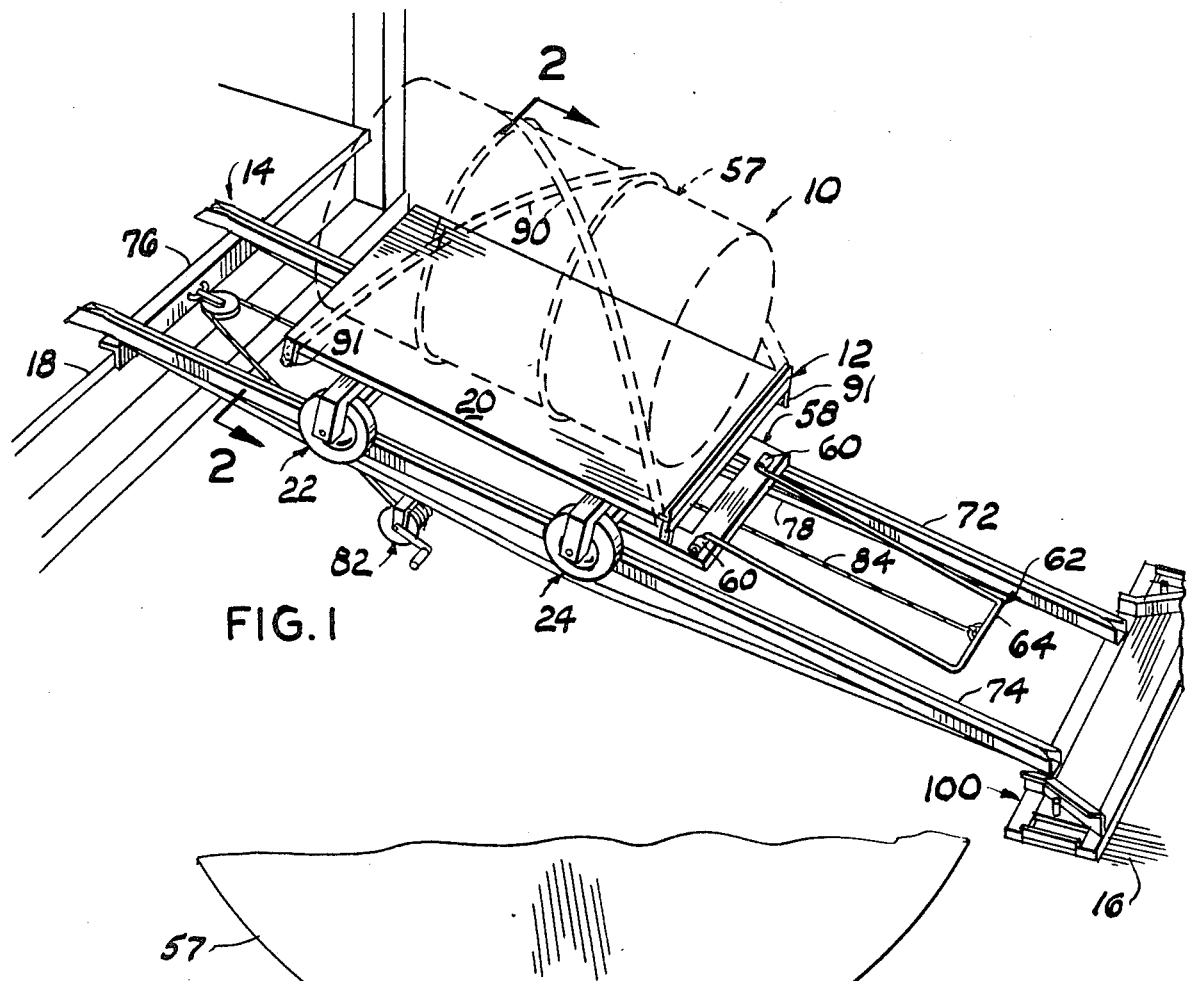
FIG. 1 is a perspective view of the device in operative position.

Like characters of reference designate like parts in those figures of the drawings in which they occur.

In the drawings:

The reference numeral 10 indicates the apparatus comprising a four-wheel dolly 12 supported by a track means 14 inclined from the surface of the earth, indicated by the surface shading lines 16, to an elevated position, such as the bed 18 at the rearward end of a pickup truck, or the like.

The dolly 12 comprises a rectangular platform 20 overlying and supported by wheel and axle frame means 22 and 24. The wheel and axle means 22 and 24 are substantially identical with the exception presently noted and in the interest of brevity only the means 22 is described in detail. The wheel and axle and frame members 22 comprise upper and lower horizontal transverse members 26 and 28 secured medially their ends to respective ends of a vertically disposed sleeve 30 having its bore coaxial with bores line drilled through the frame members 26 and 28 for the purposes presently explained.

Figure 2:
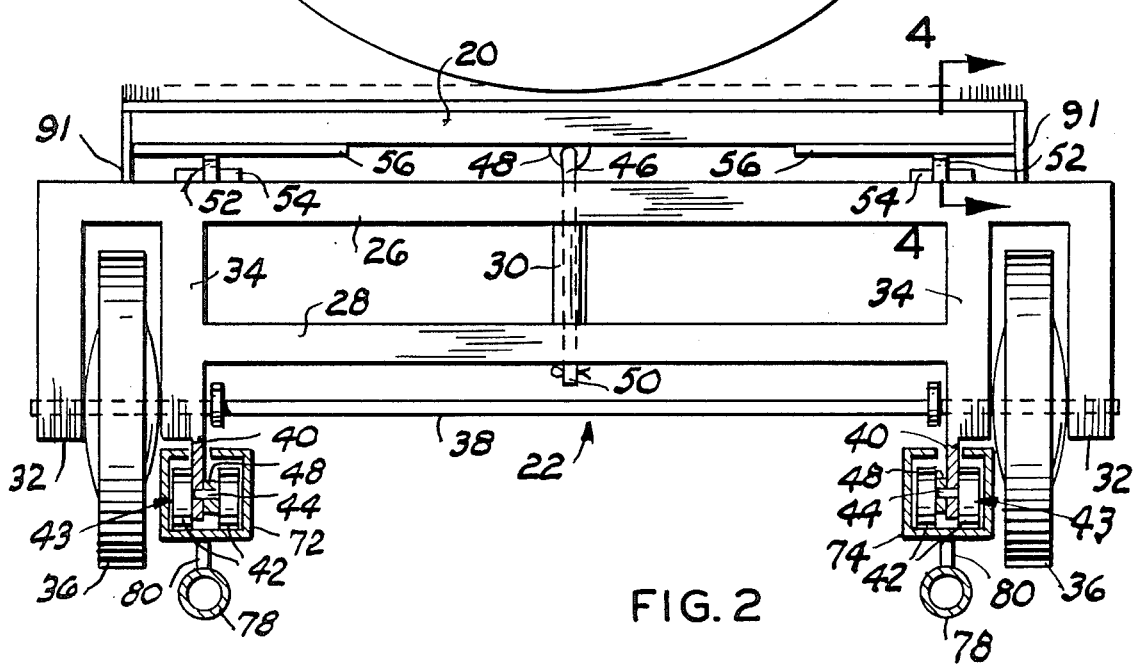
FIG. 2 is an end elevational view, to a larger scale, partially in section, looking in the direction of the arrows of the line 2—2 of FIG. 1.

At its respective ends, the top frame member 26 is rigidly connected with a pair of depending parallel wheel struts 32 and 34 with the spacing therebetween sufficient to receive a wheel 36 of selected diameter. The wheels 36 are journalled on respective ends of an axle 38 extending horizontally between the wheel struts and through bores line drilled therethrough. For rigidity the frame members 26-28 and wheel struts 32-34 are preferably formed from square or rectangular tubing. One wall of the inner wheel strut 34 is extended downwardly a selected distance, as at 40 (FIG. 2), for connection with roller means 43 comprising longitudinally aligned interconnected dual pairs of track following rollers 42. The depending limit of the rollers 42 is spaced above the depending limit of the respective adjacent wheel 36 a selected distance sufficient to insure the dolly is supported only by the wheels 36 when on the horizontal surface 16. A bolt or rivet 44 centrally connects the roller journalling member 48 to the wheel strut wall 40 and permits vertical pivoting movement of the respective pair of rollers about the axis of the rivet for the purpose presently explained.

The wheel frame means 22 and 24 are each connected to the undersurface of the platform 20 by an inverted U-shaped spacing-rod 46. The bight portion of the rod member 46 is connected by U-shaped clamps 48 to the platform 20 medially its width. The respective leg 50 of the rod member 46 project downwardly through the frame members 26 and 28 and sleeve 30 and is locked or keyed in place thus permitting horizontal pivoting movement of the wheel and frame means 22-24 relative to each other and the platform 20. The platform is maintained in vertical spaced relation above the plane defined by the top frame members 26 by rollers or bearings 52 journalled by a stub axle 54 secured to the upper surface of the respective top frame member adjacent its respective ends. Each bearing 52 underlies a plate 56 cooperatively secured to the bottom surface of the platform 20 so that a load on the platform, such as the oil filled drum 57, is supported by the four bearings 52.

The wheel frame means 24 is provided with a horizontal U-shaped tongue 58 having its legs rigidly secured to respective portions of the frame member 28. With the tongue connected thereto, the wheel and frame means 24 is hereinafter referred to as the forward end of the dolly. The length of the legs of the U-shaped tongue 58 is such that its bight portion is disposed forwardly of the forward limit of the platform 20. A pair of relatively short collars or sleeves 60 are secured in aligned relation transversely of the platform 20 to the horizontal flat upper surface of the tongue bight portion and cooperatively removably receive the foot section of L-shaped end portions of a U-shaped rod tongue 62 having elongated legs of greater length than its bight portion 64. The purpose of the tongue 62 is for manually moving the dolly 12 on the horizontal surface 16 when loaded or unloaded and for maneuvering the loaded dolly when in a track, or the like. A further purpose of the tongue is to insure winch action positioning the dolly beyond the upper limit of the tracks, as presently explained.

Figure 3:
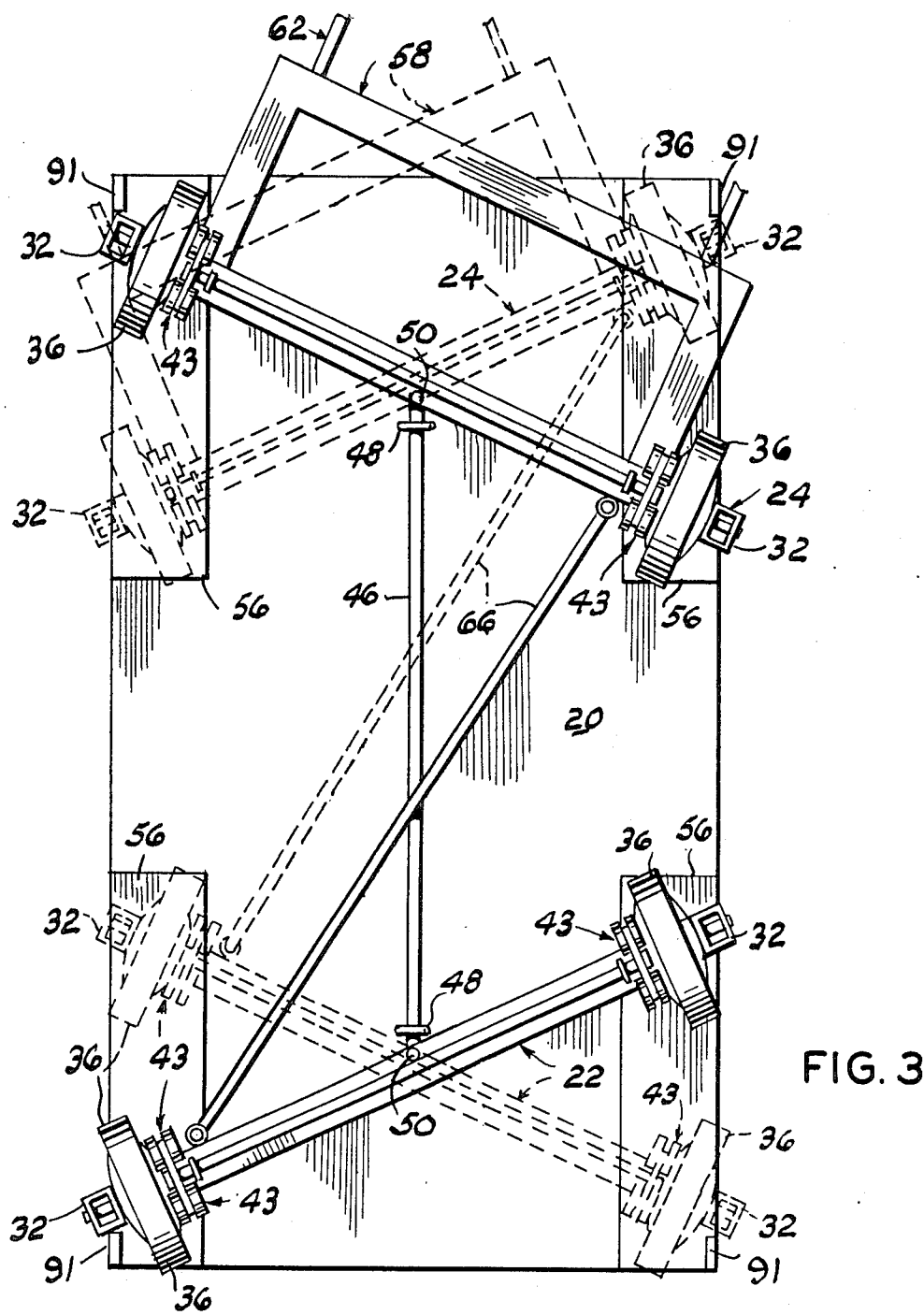
FIG. 3 is a bottom view of the dolly, per se.
Figure 4:
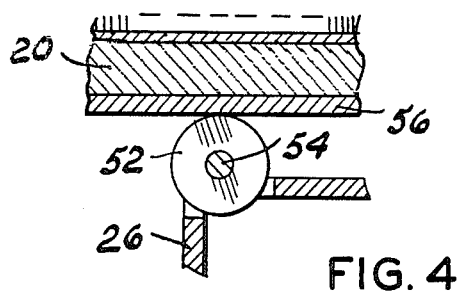
FIG. 4 is a fragmentary vertical cross sectional view taken substantially along the line 4—4 of FIG. 2.
Figure 5:
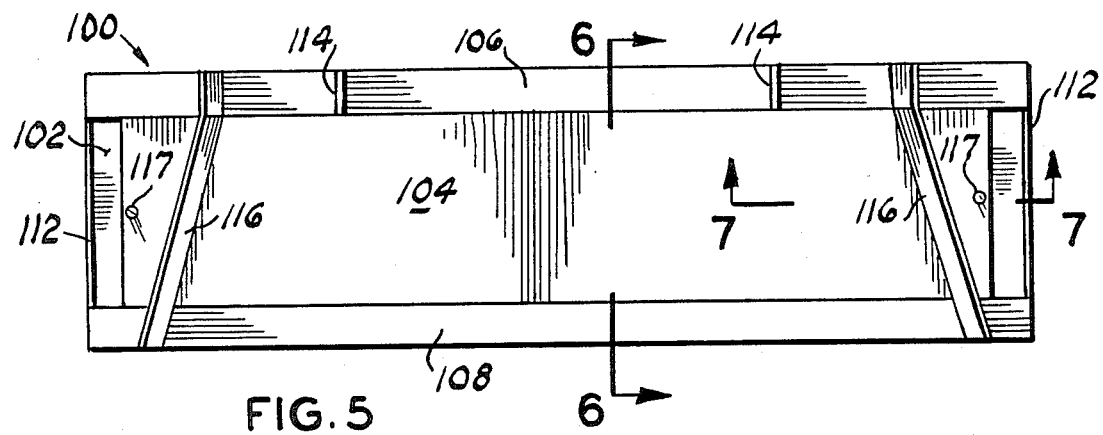
FIG. 5 is a top view, to a larger scale, of the self aligning dolly wheel and track roller guide.
Figure 6:
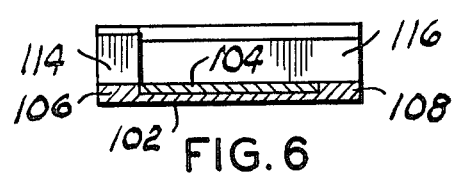
FIGS. 6 and 7 are vertical cross sectional views taken substantially along the lines 6—6 and 7—7, respectively, of FIG. 5; and, FIG. 8 is a mechanical diagram.
Figure 7:
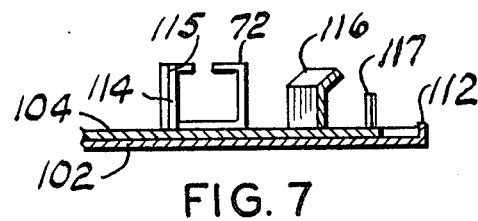

One feature of the dolly is that it may be turned on a relatively small radius which enhances its material moving features in close quarters. This is accomplished by its horizontal pivoting forward and rearward wheel and frame means 22 and 24 being controlled in the short radius movement by a U-shaped radius rod 66 horizontally extending diagonally in spaced relation with respect to the bottom surface of the platform 20 where its respective right angular end portions are pivotally journalled by sleeves 68 and 70 vertically secured to one end portion of the respective lower transverse frame member 28. This radius rod 66 thus permits articulation of the forward and rearward wheel and frame means 22 and 24, such as is illustrated by solid and dotted lines (FIG. 3).

The track means 14 comprise a pair of parallel spaced-apart tracks 72 and 74 joined at their elevated end portions by a cross member 76 and maintained, during loading operations, in a fixed position at their other ends by a dolly wheel and track roller means guide 100, as presently explained in detail. Each of the tracks 72 and 74 are box-like in transverse section (FIG. 2) and are preferably formed from metallic channel or box-like material, such as a track similar to that conventionally used in sliding door roller supporting tracks. This type of track is preferred over upwardly open U-shaped channel tracks or grooved wheels riding on pipe tracks, not shown, to prevent top heavy loads overturning the dolly when moving up or down the tracks when steeply inclined. The tracks 72 and 74 are inverted from its normally disposed sliding door position so that the longitudinally extending track slot is disposed upwardly to loosely slidably accommodate the wheel strut extended wall 40 when the pairs of dolly supporting wheel means 43 are in the respective track.

For rigidity the respective track is braced by a longitudinally extending rod or tube 78 rigidly secured to the respective end portion of each track and bowed outwardly therefrom between its respective ends with brace struts 80 interposed between the respective track and tube 78.

A manual or power winch 82 is mounted on one of the tracks intermediate its ends with the winch cable 84 entrained around block and tackle means 86 secured to the track cross member 76.

The dolly wheel and track roller guide 100 is rectangular plate-like in general configuration and principally comprises a base 102 and a sliding plate 104. In use the guide 100 extends transversely of the selected end of the pair of tracks 72 and 74. The length of the base is such that its respective end portions project a predetermined distance beyond the lateral limit of the respective track for the purposes presently apparent. The base is characterized by forward and rearward relatively narrow longitudinally coextensive thickened edge portions 106 and 108, respectively, which define a coextensive shallow recess or groove 110 having a transverse width occupying the major portion of the width of the base. The groove 110 cooperatively nests the sliding plate for longitudinal sliding movement in either direction relative to the base. The thickness of the plate 104 is substantially equal to the distance the thickened edges project above the plane of the base so that the top surface of the plate 104 lies in a plane common with the thickened edges 106 and 108 for the purpose presently apparent. The length of the plate 104 is less than the length of the base 102 a selected distance so the the plate may be reciprocated between the base ends defined by upturned end portions forming plate stops 112. Obviously the surfaces, in sliding contact, are lubricated.

A pair of strap metal lugs 114 are secured transversely to the base forward edge portion 106 in parallel edge aligned relation with the longitudinal length of the respective track for cooperative reception by a slot 115 cooperatively formed in the respective end portion of each track. The lugs 114 thus insure that the spacing between the depending ends of the tracks is equal to the spacing between the upper ends of the tracks.

A pair of fences 116 extend transversely of the guide 100 at its respect end portions in toward-the-track converging relation. Each fence of the pair of fences bridges the sliding plate 104 and is secured at its respective end portions to the forward and rearward base edges 106 and 108, respectively. The forward end portions of the fences are disposed parallel with the adjacent end portion of the respective track and are spaced therefrom a distance sufficient to permit free passage of the respective dolly wheel 36 as the track roller means 43 enters the respective track.

Operation

Assuming the dolly 12 is assembled, the track means 14 is in place with the guide 100 at their lower ends, as described above.

To transport a load, such as the oil filled drum 57, the latter is placed on the top surface of the platform 20 when the dolly is on the horizontal surface 16. The drum or other load is secured on the platform by suitable straps 90 or load binders conventionally connected with apertured lugs 91 at respective outer corner surfaces of the platform 20. With the tongue 62 connected with the dolly, the rearward end of the dolly is guided rearwardly toward the track means 14 so that its rearward wheels 36 are substantially aligned with vertical planes adjacent the lateral outward limit of the respective track 72-74 and the rearward pairs of track roller means 43 are aligned with the open ends of the tracks 72-74. The free end of the winch cable 84 is strung under the dolly and secured to the medial portion of the handle bight portion 64 and the winch operated in a cable take-up action which begins moving the rearward end of the dolly 12 up the ramp formed by the tracks.

Figure 8:
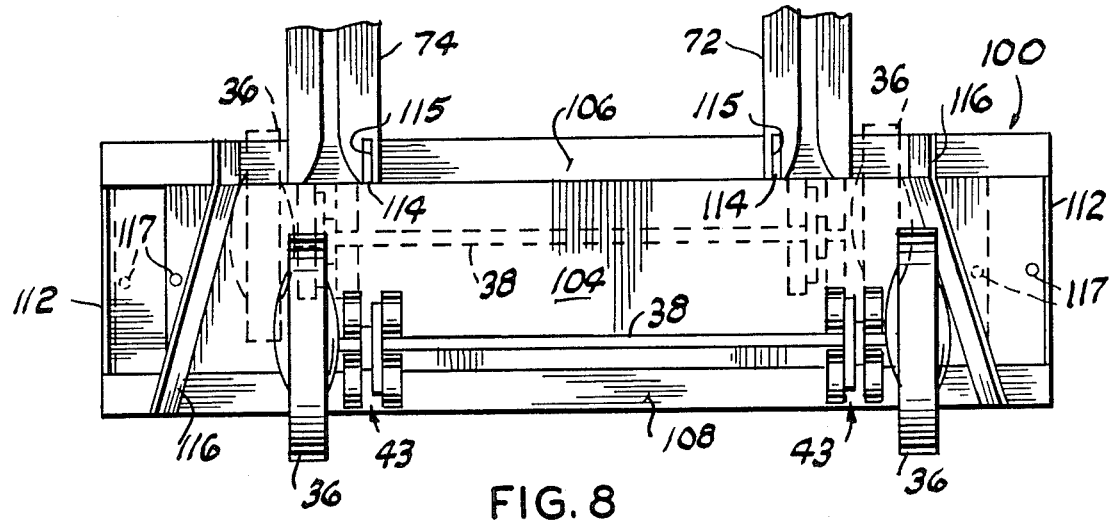

The dolly forward wheel and roller frame means 24 is usually not in accurate alignment with the tracks as illustrated by solid lines (FIG. 8). The plate 104 is manually disposed toward the end of the base in the direction of dolly wheel misalignment by the upstanding rods 117 secured to respective ends of the plate. As the winch moves the dolly up the tracks one of the dolly forward wheels 36 contacts the adjacent fence 116 moving the dolly forward end portion toward the opposite fence. When the forward wheels 36 are supported by the sliding plate 104 further movement of the dolly toward and up the tracks moves the wheel and roller forward frame means 24 (and forward end portion of the dolly platform 20) laterally by the plate sliding action relative to the base as shown by dotted lines (FIG. 8) which accurately aligns the dolly forward track roller means 43 with the respective track.

The elongated tongue 62 insures that the dolly means 12 and its load are disposed on the pickup bed 18 forwardly of its rearward limit. With the winch cable disconnected, the dolly may then be manipulated to place it and its load at a selected location for transport by the pickup.

To unload the dolly and its load from the pickup, the track means 14 is disposed, as shown by FIG. 1, with the dolly wheel guide 100 at its upper end, and, by using the tongue 62, the dolly is manually guided, with the tongue 62 directed rearwardly of the pickup truck, so that its wheels and track rollers are again cooperatively aligned with the respective track. The winch is locked inoperative and the cable is again connected with the tongue bight portion 64 with sufficient slack in the cable to permit the dolly to be moved on and supported by the tracks until downward movement is arrested by the cable and the locked winch. By operating the winch in a paying-out action of the cable, the dolly is progressively lowered to the horiontal surface 16.

When not in use or for transport, the dolly is easily disassembled by springing the tongue legs inwardly to be removed from the collars 60, removing the radius rod 66 and separating the wheel and axle and frame means 22 and 24 from the spacing rod 46.

Obviously the invention is susceptible to changes or alterations without defeating its practicability. Therefor, I do not wish to be confined to the preferred emodiment shown in the drawings and described herein.

I claim:

1. A climbing dolly system, comprising:
   a normally horizontal platform having forward and rearward ends;
   frame means including an axle underlying and depending upon respective end portions of said platforms;
   at least one of said frame means being pivotally connectd with the platform for horiozntal pivoting movement about a vertical axis;
   each said frame means including at least one transverse frame member having at least one wheel strut depending from its respective ends;
   tongue and handle means connected with said one frame means for manual steering movement of said dolly on a horizontal surface;
   wheels journalled by said axles for supporting respective end portions of said platform in a mobile manner when on a horizontal surface;
   track means including a pair of box channel tracks disposed in spaced parallel relation extending in a fixed position between vertically spaced horizontal support surfaces for supporting the dolly during movement from one elevation to another;
   roller means moveable on said track means including two pairs of rollers connected with the depending end portion of each said wheel strut in forward to rearward aligned spaced relation adjacent the respective wheel and spaced upwardly with respect to a horizontal surface supporting the wheels,
   the rollers of each pair of said pair of rollers being juxtaposed transversely of the dolly platform;
   a pulley block secured to one end portion of the track means; and,
   which means mounted on the track means and having a flexible element entrained through the pulley block for moving the dolly along the track means.

2. The dolly system according to claim 1 in which said guide means comprises:
   a rectangular flat base extending transversely of the longitudinal axis of the track means; and,
   plate means longitudinally slidably overlying said base for supporting and selectively moving said wheels laterally as a unit when crossing the base, said wheel guide means including fence means on said base normally engaged by said wheels when misaligned with the track means.

* * * * *